US009386358B2

(12) United States Patent
Jackson et al.

(10) Patent No.: US 9,386,358 B2
(45) Date of Patent: Jul. 5, 2016

(54) AUTOMATIC IDENTIFICATION OF RELEVANT VIDEO CONTENT THROUGH REPLAYS

(71) Applicant: ECHOSTAR TECHNOLOGIES L.L.C., Englewood, CO (US)

(72) Inventors: Robert Jackson, Englewood, CO (US); William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 15 days.

(21) Appl. No.: 14/290,802

(22) Filed: May 29, 2014

(65) Prior Publication Data

US 2015/0350747 A1 Dec. 3, 2015

(51) Int. Cl.
*H04N 21/8549* (2011.01)
*H04N 21/234* (2011.01)
*H04N 21/4147* (2011.01)
*H04N 21/431* (2011.01)
*H04N 21/433* (2011.01)
*H04N 21/44* (2011.01)
*H04N 21/4402* (2011.01)
(Continued)

(52) U.S. Cl.
CPC ...... *H04N 21/8549* (2013.01); *G06F 17/30843* (2013.01); *G06K 9/00751* (2013.01); *G06K 9/4652* (2013.01); *G06T 7/408* (2013.01); *H04N 21/23418* (2013.01); *H04N 21/4147* (2013.01); *H04N 21/431* (2013.01); *H04N 21/4334* (2013.01); *H04N 21/44008* (2013.01); *H04N 21/44029* (2013.01); *G06T 2207/10016* (2013.01); *G06T 2207/10024* (2013.01)

(58) Field of Classification Search
CPC .............. H04N 21/8549; H04N 21/23418; H04N 21/4147
USPC .............. 725/38, 9, 20, 87, 86, 90; 382/103
See application file for complete search history.

(56) References Cited

U.S. PATENT DOCUMENTS

2002/0080162 A1* 6/2002 Pan et al. .......... 345/723
2002/0194595 A1* 12/2002 Miller et al. .......... 725/36
(Continued)

OTHER PUBLICATIONS

Li Fang Gu et al: "Replay Detection in Sports Video Sequences", Multimedia '99, Proceedings of the Eurographics Workshop in Milano, Italy, Sep. 7-8, 1999, pp. 3-12, XP055202357, Vienna, Austria.

(Continued)

*Primary Examiner* — Nathan Flynn
*Assistant Examiner* — Caroline Somera
(74) *Attorney, Agent, or Firm* — Ingrassia Fisher & Lorenz, P.C.

(57) ABSTRACT

Summaries of video programs can be automatically created by identifying and compiling repeated portions of the program content. In many programs (such as broadcasts of sporting events), the most interesting portions of the event are often repeated more than once during the course of the program. By automatically identifying the replayed portions of the video presentation, then, a highlight summary of a television broadcast can be automatically created. Repeated imagery can be automatically identified by comparing metric values representing the contents of video frames. This technique can be implemented within a set top box or other television receiver that is operated by a viewer, thereby providing a high level of flexibility and convenience.

13 Claims, 3 Drawing Sheets

(51) Int. Cl.
*G06T 7/40* (2006.01)
*G06K 9/46* (2006.01)
*G06K 9/00* (2006.01)
*G06F 17/30* (2006.01)

(56) References Cited

U.S. PATENT DOCUMENTS

| | | | | |
|---|---|---|---|---|
| 2003/0118322 A1* | 6/2003 | Kim | ............... | H04H 20/28 386/259 |
| 2003/0141665 A1* | 7/2003 | Li | ............... | 273/440.1 |
| 2004/0017389 A1 | 1/2004 | Pan et al. | | |
| 2005/0271269 A1* | 12/2005 | Errico et al. | ............... | 382/164 |
| 2009/0028440 A1* | 1/2009 | Elangovan et al. | ............... | 382/216 |
| 2014/0298378 A1* | 10/2014 | Kelley | ............... | 725/32 |

OTHER PUBLICATIONS

European Patent Office International Searching Authority, International Search Report and Written Opinion for the International Application No. PCT/US2015/029758 mailed Jul. 24, 2015.

* cited by examiner

AUTOMATIC IDENTIFICATION OF RELEVANT VIDEO CONTENT THROUGH REPLAYS

TECHNICAL FIELD

The present disclosure generally relates to video processing. More particularly, the following discussion relates to devices, methods and systems that automatically identify important parts of a television broadcast or other video presentation.

BACKGROUND

Set top boxes and other television receivers now incorporate powerful computing resources capable of providing features well beyond passive television viewing. Modern television receivers often provide time shifting capabilities (e.g., digital video recorders), place shifting capabilities and/or additional tuners for receiving multiple simultaneous programs, to name just a few examples. These new capabilities allow viewers to watch more programming at times and places that were not previously thought to be possible.

Often, however, viewers do not have the time or the desire to watch the entirety of a program, movie or other video presentation. In such cases, it would be helpful to have a summary or "highlight reel" so that the viewer could enjoy the most relevant portions of the presentation without watching the entire program. A broadcast of a sporting event, for example, could be summarized by the "big plays", such as scoring events or the like.

At present, however, such summaries are most commonly available from news broadcasts or other media sources in which a producer, reporter or newscaster manually compiles video highlights for broadcast as part of a news report or the like. While news-type summaries can be helpful, they are usually only available for events that are of general interest to the newscaster's target market. Summaries are not available for the vast majority of programming that is otherwise available to the viewer. Moreover, news summaries are usually only available after some time has elapsed, making the summary less useful to the viewer. It would be helpful to have summaries for a wider array of programs that are available to the viewer on a more immediate basis.

Additionally, news-type summaries are generally very labor intensive to create. One or more human viewers (e.g., a producer, reporter or editor) typically watch the event itself to subjectively select the portions that are truly "highlights". The selected highlights are typically manually compiled for a news broadcast or the like, which is often limited in time and/or may have other constraints on the types and amounts of "highlight" content that can be presented. Even when news-type program summaries are available, then, these tend to be constrained in time and content. Moreover, these summaries are typically limited to just the highlight content; there is no convenient way for the viewer to access content before or after the highlighted event occurs. It would be far more useful if summaries could be automatically created for certain programs that are of particular interest to individual viewers.

It is therefore desirable to create systems, devices and methods for automatically identifying the portions of particular television programs, movies or other video presentations that are of greatest interest to the user. These and other desirable features and characteristics will become apparent from the subsequent detailed description and the appended claims, taken in conjunction with the accompanying drawings and this background section.

BRIEF SUMMARY

Various embodiments provide systems, devices and methods to automatically create "highlight reels" or other summaries of television broadcasts, movies or other video presentations. In many programs (e.g., broadcasts of sporting events), the most interesting portions of the event are replayed more than once. The portions of the broadcast that are repeated, then, often correspond to the most relevant, interesting, exciting and/or important parts of the broadcast. Various embodiments are therefore able to automatically create a highlight summary of a television broadcast by identifying and extracting those portions of the presentation that are repeated.

Various embodiments provide a set top box or other a television receiver device that comprises a television receiver interface, a display interface and a processor. The television receiver interface is configured to receive a broadcast of a television program that is selected by a viewer. The display interface is configured to provide a video output comprising the television program for presentation to the viewer on a display. The processor is configured to automatically identify portions of the received television broadcast that are replayed during the broadcast, to automatically extract and compile the identified portions of the television program that are replayed during the broadcast into a summary of the television program, and to provide the compiled summary of the television program selected by the viewer to the display interface for presentation to the viewer.

Other embodiments provide methods executable by a set top box or other processing device to create a summary of a television broadcast. The method suitably comprises: receiving the television broadcast at the processing device; computing, for each of a plurality of video frames of the television broadcast, a metric that represents the contents of the video frame; correlating the metrics representing the contents of different video frames to thereby identify repeated portions of the television broadcast; and compiling the repeated portions of the television broadcast as the summary of the television broadcast. In various embodiments, the highlights may be tracked or maintained in the context of the full program in case the user wants to view more of the content occurring around the highlighted event.

These examples and other embodiments, aspects and features are described in detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, the most relevant scenes of a video presentation are identified through replays of that scene during a broadcast or other video presentation. A broadcast of a sporting event, for example, often contains "instant replays" or other repeat showings of scoring, penalties, close calls or other scenes of interest that occur during the event. The portions of the broadcast that are replayed, then, tend to be the scenes that are of greatest interest to the viewer. A "highlight reel" or similar summary of a video presentation can therefore be automatically created by identifying, storing and compiling clips of replayed scenes.

In various embodiments, video frames of the received programming are analyzed to create a digital value or metric that can represent some or all of the pixel data of the video frame. An average pixel intensity, for example, can be compared to the average pixel intensities of other frames to identify repeating portions of the video content. These repeating portions can be automatically identified, extracted and compiled into a "highlight reel" of replayed content for the viewer.

The various techniques described herein may be implemented in any setting, including video production, television broadcasting, or the like. Some implementations may be embodied within a set top box (STB) or similar television receiver to automatically create summaries of programs viewed, received and/or recorded by individual viewers. A home television viewer, for example, may wish to view summaries of one or more programs to see highlights of the programs, to determine if he or she wants to take the time to view the entire broadcast, or for any other purpose. An automatic summary creation capability provided in the user's home television receiver can greatly improve convenience and viewing efficiency for the viewer by providing automatically-generated summaries of the particular programs of interest to that viewer at times that are of greatest value to the viewer. Moreover, various embodiments could link the highlight to the full programming content stored on a DVR or the like so that the viewer is able to view the highlight in context, or to otherwise readily access programming occurring just before or just after the highlight. Equivalent embodiments may provide additional or alternate features, and/or may be implemented in any number of other devices or settings as desired.

Figure 1:
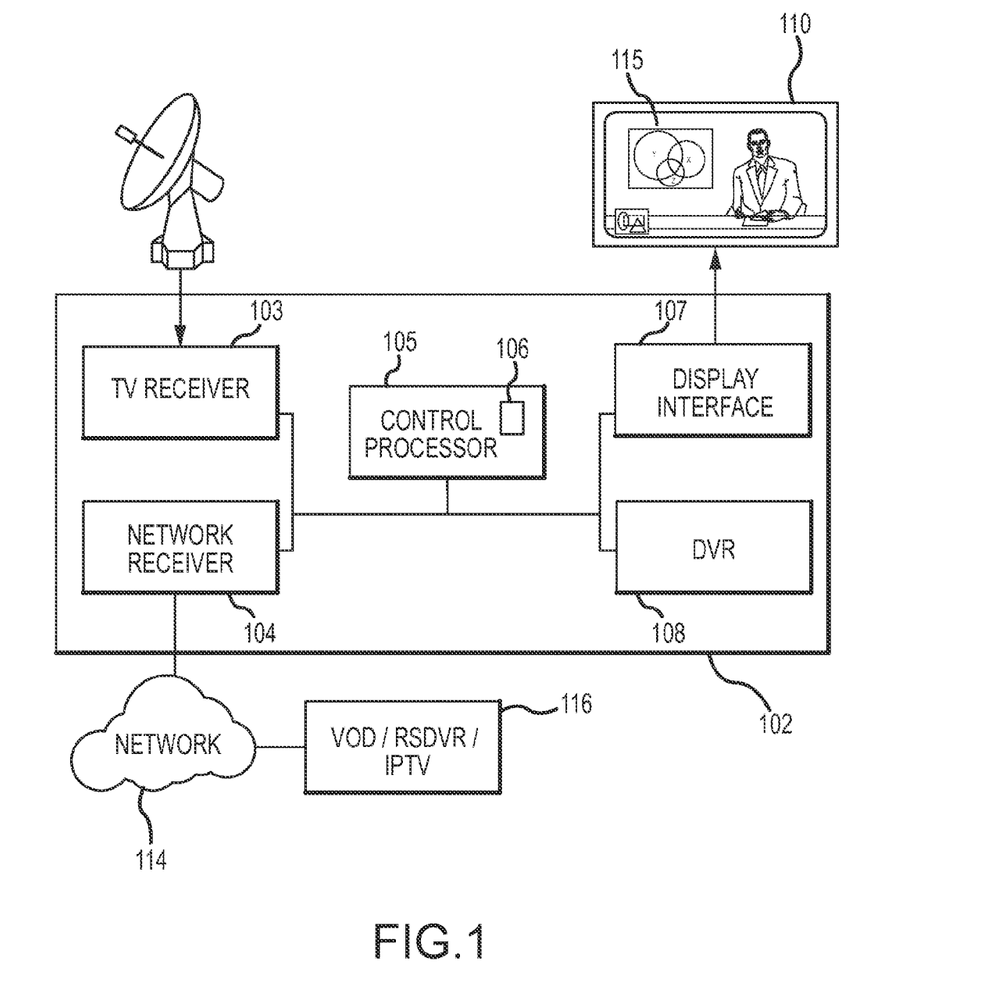
FIG. 1 is a block diagram of an example television receiver that is capable of automatically creating highlight summaries of received programming.

Turning now to the drawing figures and with initial reference to FIG. 1, an exemplary television receiver system 100 suitably includes a set top box or similar video receiver 102 that receives video programming, that automatically generates video summaries of the received programming, and that provides output signals to a display 110 for presentation to viewers. In various embodiments, video receiver 102 receives broadcast television content from a cable, direct broadcast satellite (DBS), terrestrial broadcast or other source 118, as in a conventional STB receiver. Other embodiments could alternately or additionally receive content from a network source 116, such as a video-on-demand (VOD) service, an IP television (IPTV) service, a remote storage digital video recorder (RSDVR), or any other source. Still other embodiments could additionally or alternately receive content from a digital video recorder 108, an external media player (e.g., a DVD or Blu-Ray player, a digital media player and/or the like) or from any other source, as desired. In the illustrated example, television receiver 102 is a consumer-type device that is generally operated within a television viewer's home, business or other customer premises so that individual viewers select the particular video contents that are received and processed. Other embodiments, however, could be implemented within video production, editing and/or distribution environments as desired.

Video receiver 102 as illustrated in FIG. 1 includes a television receiver interface 103, a display interface 107, and a control processor 105. Various embodiments could additionally include a network interface 104, a digital video recorder (DVR) or similar storage 108, and any number of additional or alternate components as desired. In various embodiments, video receiver 102 includes a video frame identification and comparison module 106. Module 106 may reside as a software or firmware application that is stored in digital memory or the like, and that is executed by control processor 105 as described below.

Control processor 105 suitably includes any sort of microprocessor, microcontroller, digital signal processor or other processing hardware capable of controlling each of the interfaces of device 102 in response to received instructions to thereby produce outputs to display 110, as desired. In various embodiments, control processor 105 provides suitable processing circuitry, memory and input/output interfaces to perform the various functions described in conjunction with FIGS. 2-3 below. Various processing chips available from VIXS Systems, NXP Semiconductor, Broadcom Corporation, Conexant Corporation and/or others, for example, could be used to provide video processing and other functions as described herein. In many embodiments, additional chips or other circuitry may be provided to support additional encoding, decoding, switching, processing and/or other functions, as desired. Other embodiments may perform the various functions of module 106 in a separate processor, including a cloud type processor residing remotely from device 102 on network 114 or elsewhere.

Television receiver interface 103 includes suitable hardware, software, firmware, control logic and/or the like to receive television programming signals from a broadcast source 118. As noted above, sources of television programming could include cable, DBS, terrestrial broadcast and/or other sources, as desired.

Display interface 107 similarly provides appropriate hardware, software, firmware, control logic and/or the like to facilitate video output for presentation on display 110. Display interface 107 may provide the output using component, composite, S-video, HDMI, USB, LIGHTNING and/or any other formats, as desired.

Network interface 104 includes any appropriate hardware, software, firmware, control logic and/or the like to facilitate communications with a local area or other network, such as network 114. In various embodiments, network interface 104 is a conventional ETHERNET (IEEE 802.3) interface that allows a physical connection to a local area network operating within the customer's home. Equivalent embodiments may implement network interface 104 using a wireless interface such as a WI-FI (IEEE 802.11) interface or the like. Network interface 104 may facilitate communications with a content source 116 on network 114, for example.

In operation, receiver device 102 suitably executes a processing module 106 that computes metric data for video frames 115 of the video programming received at the device 102. The metrics associated with the various frames are cross-correlated or otherwise evaluated to identify repeated frames of video imagery. These frames, in turn, can be extracted or otherwise presented to the viewer as a summary of the video programming.

Figure 2:
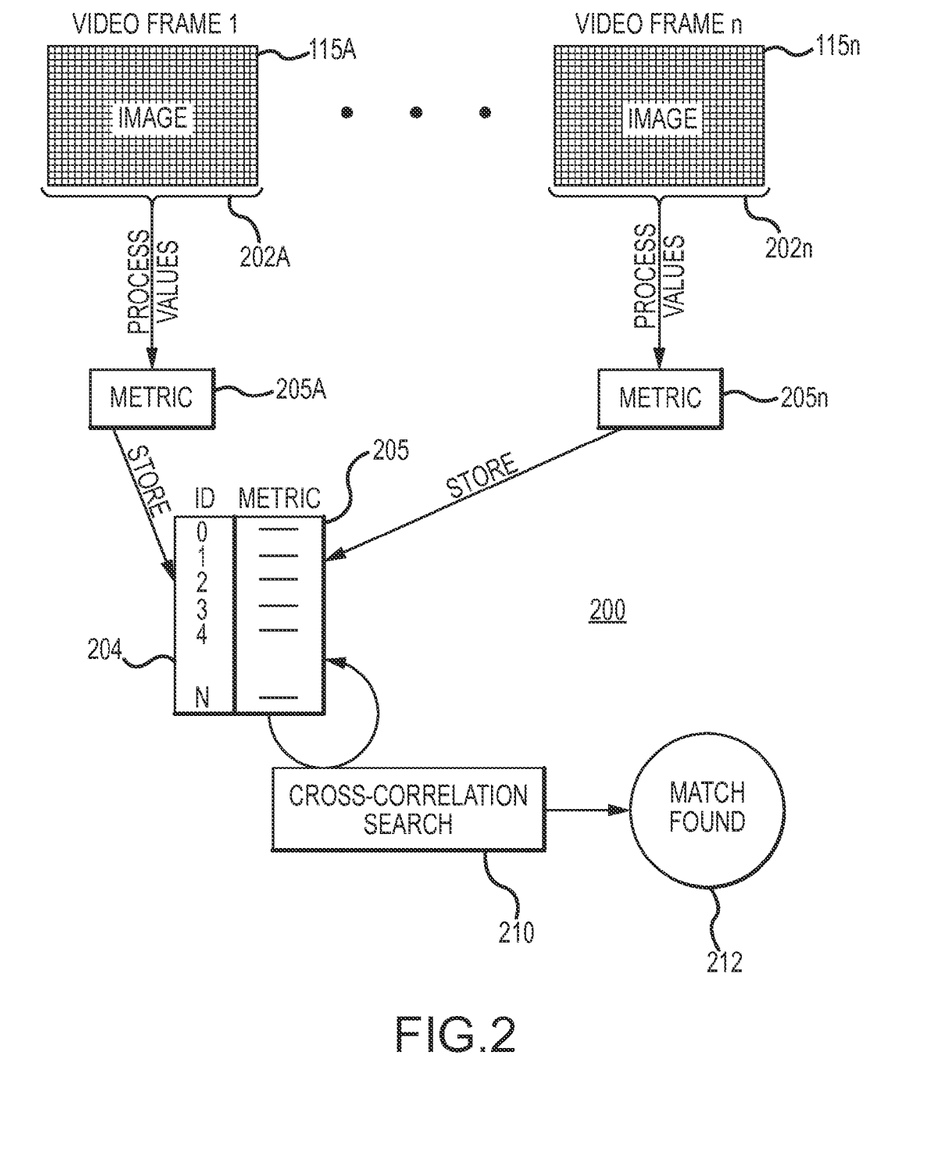
FIG. 2 is a diagram of an example process executable by a television receiver or other computing device to identify replayed content in a video presentation.

Turning now to FIG. 2, an exemplary process 200 to identify repeated video content in a television program or other video presentation suitably includes creating a numerical metric 205A-N for two or more video frames 115A-N (respectively) of the presentation, and then performing a correlation search (function 210) for other frames 115 with similar metrics 205. The various functions shown in FIG. 2 may be performed by software or firmware residing within video receiver 102, such as software executed by processor 105. Other embodiments could implement process 200 using other types of hardware, software, firmware and/or other programmable logic executing on any device and/or in any environment.

Video frames 115A-N may be selected from the imagery of the received program in any manner. In various embodiments, the various frames 115A-N are selected for processing based upon any regular or irregular temporal scheme, such as every second, every few seconds, or every fraction of a second, as desired. Other embodiments may select frames 115 for analysis based upon the encoding of the frame (e.g., giving preference to MPEG i-frames over p-frames and b-frames), or the spacing of the frames themselves (e.g., analyzing every Nth frame, where N is an integer number of frames). Other embodiments may select frames 115 for analysis based upon the estimated or measured differences from prior frames (e.g., frames that are most likely to represent new scenes can be given preference over frames that are more similar to the prior scenes). Other frame selection techniques may be used, and any number of frames 115A-N may be selected for processing. Increasing the number of frames 115 to be considered may improve the accuracy of results, but at the expense of consuming additional processing resources on device 102. The particular selection frequency will therefore depend upon the available processing capabilities and the level of accuracy desired.

Metrics 205A-N for the various frames 115A-N may be computed in any manner (function 202). To that end, metric 205 is any numeric representation of the underlying content of a video frame 115. Different types of metrics 205 may be formulated based upon numeric values associated with pixels rendered in the video frames 115. Examples of pixel values could include the luminance ("luma") and/or chrominance ("chroma") values, as appropriate. Some embodiments may consider only a subset of the available pixel values rather than the entire set of pixels contained in the image to conserve processing resources and/or to exclude portions of the imagery that are likely to provide misleading results. If a broadcast of a program is known to provide an information "ticker", a channel identification "bug", and/or other imagery that may affect comparisons to other frames, then the pixels containing the misleading imagery may be excluded from further processing as desired. Equivalent embodiments may consider other types of image data other than or in addition to pixel values, as desired.

The particular metric 205 used to represent each frame 115A-N may be computed in any appropriate manner. Ideally, each metric 205A-N provides a relatively unique numeric identification of the underlying video imagery of an associated video frame 115A-N (respectively) that can be used to identify replays of that same imagery. Various embodiments could use one-way functions such as hashes, digests, checksums and/or the like, for example, to create relatively unique metrics 205A-N for each frame 115A-N. Other embodiments could simply compute an average of two or more pixel values to represent the underlying imagery of the frame 115. A metric 205 that is simply the average luminance of the pixels in the frame 115, for example, could identify each frame 115 with enough uniqueness for many applications. Other functions that could be used to create suitable values for metric 205 could be derived from digital cryptography (e.g., digest or hash algorithms), statistics (e.g., mean/median/mode/deviation algorithms) and/or other fields as appropriate. The resolution of each metric 205 (e.g., the number of significant digits for each metric value) is determined by the available processing resources and the level of uniqueness desired; additional resolution will provide more unique values for metrics 205, but at the expense of additional processing resources.

The computed metric values 205A-N for each video frame 115A-N can be stored in a table or other data structure 204 for subsequent processing, as desired. Table 204 as shown in FIG. 2 includes the computed metric value 205 for each frame, along with an identifier of the frame 115A-N that is associated with each value 205A-N so that the associated frame can be identified in subsequent processing. The identifier may be a frame identifier or timestamp, such as any identifier or stamp extracted from MPEG data encoding the analyzed frame, or from any other source. Table 204 may be stored in memory or other storage available to processor 105. In some implementations, it may not be necessary to store all of the metric values 205 for the entire video program. If replays are assumed to occur within a few minutes of each other, for example, table 204 may only need to include those values computed within the relevant analysis time window.

After metrics 205A-N are obtained for multiple video frames 115A-N, then the various metrics 205A-N can be compared with each other to identify repeated video frames 115A-N (functions 210, 212). This comparison may be a frame-by-frame comparison or a statistical cross-correlation analysis that considers sequences of video frames, as desired. In a frame-by-frame analysis, a match 212 may be identified when the difference between two metrics 205A-N differ by less than an appropriate threshold value. The particular threshold value will depend upon the resolution of the metric values 205 and the level of accuracy desired. Generally speaking, a larger threshold will tend to be more inclusive (e.g., to find more matches) but with an increasing likelihood of false positives. A smaller threshold value will tend to eliminate more erroneous results, but will also be less tolerant of minor differences between video frames 115A-N. Note that matches 212 may be identified even though the compared frames are not perfectly identical; replayed program segments may differ slightly (e.g., different text overlays, commentator edits, etc.) even though most of the program imagery is repeated. Threshold values may therefore be selected to accommodate at least some variation in metric values 205A-N derived from repeated video frames 115A-N.

Further embodiments may additionally or alternately compare series of sequential metric values 205 against each other. That is, even if a particular video frame 115 does not trigger a match 212, a sequence of frames 115 may be cross-correlated against another sequence of frames 115 from the same program to identify similarities. Lengths of various sequences may be determined based upon processing capabilities and desired accuracy; shorter sequence lengths would be generally expected to provide more matches, but potentially more false positives. Various cross-correlation techniques make use of linear regression, first or second derivative analysis, statistical analysis and/or other mathematical techniques as desired.

Figure 3:
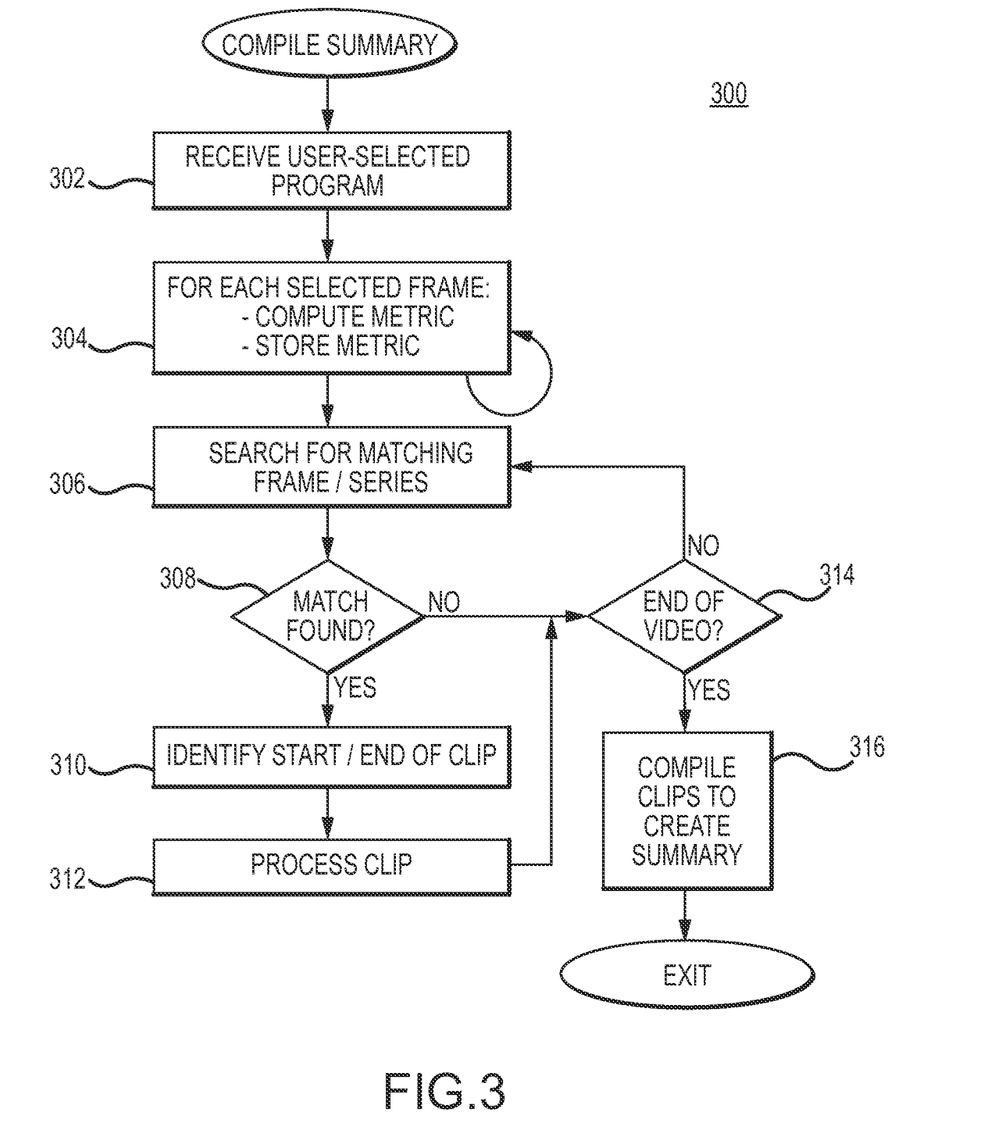
FIG. 3 is a flowchart of an example process executable by a television receiver or other computing device to compile highlights of a video presentation.

FIG. 3 shows a flowchart of an exemplary process 300 that could be implemented within a television receiver 102 or other video processing device to automatically create a video summary of a program that is selected by a television viewer. The various functions 301-314 may be carried out under the direction of software or firmware executed by processor 105 and/or other computing hardware within device 102 shown in FIG. 1, for example. Other embodiments may implement some or all of the functions shown in FIG. 3 using other hardware, software, firmware or other programmed logic as desired.

As noted above, the analyzed program may be received from any source (function 302). In an embodiment implemented within a television receiver 102, the analyzed program will typically be a program selected by a viewer using an electronic program guide (EPG), channel selector, or other conventional program selector. Analyzed programming may be broadcast television programs received by television receiver 103, streaming media received from a network source 116, stored media from a DVR 108 or other source, or any other programming as desired.

Numerical metrics 105 for some or all of the video frames 115 of the selected program are computed and stored as appropriate (function 304). As noted above, analyzed frames 115 may be selected based upon any temporal, spatial or other basis, as desired, and may include any percentage of the total frames 115 making up the program content. Metrics 105 may be computed according to any algorithm or technique, as described above, and stored as a table 204 or other data structure within memory or other storage for further processing.

Matching video frames 115 may be identified in any manner (function 306) using metrics 205 computed in function 304. Each metric 205 numerically represents the pixel imagery in one video frame 115, so metrics 205 computed according to the same algorithm can be compared to each other to identify frames that present similar imagery. As noted above, metrics 205 may be individually compared with other metrics 205 associated with different frames 115, and/or sequential series of metrics 205 may be compared with other series to identify repeated video imagery.

When a match is found (function 308), then further evaluation occurs to determine if the match is part of a repeated video sequence that could be part of a video summary function. To that end, additional processing is performed to identify a beginning and an end of a video clip (function 310). Typically, replayed video sequences are identified by a series of frames 115 having similar metrics 205. In various embodiments, the threshold values used to evaluate differences in metric values 205 may be relaxed slightly when a first matching frame 115 is found so that additional frame matches are easier to identify. Starting and ending points of matching video portions can be tracked using the identifiers in table 204. In some embodiments, table 204 contains an additional data field so that matching frames 115 can be flagged for further processing, as appropriate. Other embodiments may create a new table or other structure that tracks repeated frame sequences, as desired. In various embodiments, it may be helpful to track a number of times that a particular sequence is repeated; sequences that are repeated two or more times, for example, may be given preference in the video summary over less-repeated sequences.

Clips of replayed video can be tagged, extracted or otherwise identified for further processing in any manner (function 312). In various embodiments, the replayed video frames 115 are simply flagged or otherwise identified in table 204 for further processing. That is, the frames 115 to be included in the extracted clip may be simply identified for subsequent playback from within the programming stored in DVR 108. Other embodiments could copy the decoded frames 115 into a new video file to be stored in DVR 108 or other storage within device 102, if desired, to create a highlight video that is shorter in duration than the stored program. Frames 115 may be tagged, extracted or otherwise identified for further processing in any other manner.

Replayed content is identified throughout the duration of the program (function 314). Although the example of FIG. 3 shows processing from function 314 returning to function 306, equivalent embodiments could return to functions 302 or 304 to indicate that analysis is done as the program is being received from a broadcast source or retrieved from a DVR or the like. To that end, identification of replayed content (functions 304-314) may be performed at any time during reception or playback of a broadcast program, during playback of a stored program, while the program is stored on a DVR or elsewhere, or at any other time. In some implementations, recorded programs may be evaluated and video summaries may be compiled while the device 102 is otherwise relatively idle, such as at night.

The video summary may be compiled from the identified clips in any manner (function 316). As noted above, repeated video frames 115 may be tagged for playback from DVR 108 or otherwise processed to create a new video summary of the original program. Other embodiments may be able to extract the identified video segments from a stored copy of the original program itself at the time of playback. Still other embodiments could use otherwise-idle tuners in a STB or other television receiver to create summaries of received programs. A sports fan, for example, could use idle tuners to receive and summarize highlights of sports programming received on a multitude of channels even if the viewer does not intend to record or watch the underlying programs. To that end, highlights of multiple programs broadcast on any number of channels could be combined into a single "highlight reel" of the day's (or the week's) sports programming. Particular programs (e.g., certain sports, certain teams, certain players, etc.) could be isolated for inclusion or exclusion in the summary based upon EPG data, and EPG data can allow the receiver 102 to identify programs of potential interest to the viewer that can be received and summarized. Summaries may also be created based upon repeated images identified in multiple programs or multiple channels. If a particular clip is re-run many times on multiple channels, for example, it may be of particular interest for inclusion in the automated summary. Other embodiments could provide additional features and/or operate in any other manner, as desired.

The compiled summary may be presented the viewer in any manner; in some implementations, the summary is provided within a DVR program listing in conjunction with the underlying program so that the viewer is able to select a "view summary" option or the like when browsing the program in the DVR menu. Other embodiments may deliver the compiled summary video for presentation to the viewer in any other manner using display interface 107 or the like. Other embodiments could placeshift the summary video to the viewer's computer, phone, tablet or other device via network interface 104.

Process 300 may be supplemented or enhanced in any manner. In various embodiments, the video summary may be configurable to limit the length of repeated clips, to limit the length of the overall summary, to limit the number of clips in the summary, or in any other manner. Search parameters may also be configurable so that only a portion of the received program is searched for replays (e.g., only a few minutes of content are searched). Other embodiments, however, could identify replays occurring anywhere within the program in an attempt to capture highlighted content that is identified and replayed by the program's producer, as desired. If the program content includes highlights at half time or at other breaks in the action, for example, these repeated video frames can be recognized and added to the automatically-created highlight summary, as desired.

Still further embodiments could augment the automatic highlight feature by allowing the viewer to conveniently view the programming occurring just prior or just after the identified highlight, or to start viewing of the stored program from the point of the identified highlight. Information in table 204, for example, can readily identify a starting point for playback, or at least correlate the frames 115 of the highlight clip to preceding and/or succeeding frames stored in DVR 108 or elsewhere. Such embodiments could therefore allow the viewer to watch a highlight clip and, upon further input from the viewer, to continue viewing the stored programming from the point that the highlighted event occurred. That is, the highlight clip can provide a "point of entry" for viewing the programming stored on the DVR 108, therefore providing a very convenient aid to the viewer.

Various embodiments therefore provide systems, devices and methods/processes to automatically create summaries of user-selected television programs or other video programming. The general concepts described herein, such as the identification of repeated program images based upon computed metrics and the use of repeated imagery in automatically compiling video summaries, maybe readily applied to content creation, editing, distribution, broadcast and/or the like.

The term "exemplary" is used herein to represent one example, instance or illustration that may have any number of equivalent alternatives. Any implementation described herein as "exemplary" is not necessarily to be construed as preferred or advantageous over other possible implementations. While several example embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A television receiver device that comprises:
   a television receiver interface configured to receive a broadcast of a television program that is selected by a viewer;
   a display interface configured to provide a video output comprising the television program for presentation to the viewer on a display; and
   a processor configured to automatically identify portions of the received television broadcast that are replayed during the broadcast by creating, for each of a plurality of video frames in the television broadcast, a metric that represents the contents of the video frame with a cryptographic digest that is a function of the luminance and chrominance values of at least some of the video pixels in the video frame, and by cross-correlating the metrics created for multiple ones of the plurality of video frames to thereby identify video frames that are substantial duplicates of each other, and wherein the processor is further configured to automatically compile the identified portions of the television program that are replayed during the broadcast into a summary of the television program, and to provide the compiled summary of the television program selected by the viewer to the display interface for presentation to the viewer.

2. The television receiver device of claim 1 wherein the cross-correlating comprises identifying a beginning and an end of a replayed portion of the television broadcast.

3. The television receiver device of claim 1 further comprising a digital video recorder configured to store the broadcast of the television program, and wherein the processor automatically identifies the portions of the received television broadcast that are replayed by analyzing video frames of the received television broadcast that are stored on the digital video recorder.

4. The television receiver device of claim 3 wherein the processor automatically identifies the replayed portions of the television broadcast by creating, for each of the analyzed video frames, a metric that uniquely identifies the contents of the video frame, and by cross-correlating the metrics created for the analyzed video frames to thereby identify video frames that are substantial duplicates of each other.

5. The television receiver of claim 4 wherein the processor is configured to store the compiled summary of the television program selected by the viewer in the digital video recorder prior to providing the compiled summary to the display interface.

6. The television receiver of claim 3 wherein the processor is further configured to link the identified portions of the television broadcast to the version of the broadcast program that is stored in the digital video recorder so that, in response to an input from the viewer, the version of the broadcast program stored in the digital video recorder is rendered for viewing from a point in time beginning with the identified portion of the television broadcast.

7. The television receiver of claim 1 wherein the compiled summary of the television program contains only the identified portions of the television program that are replayed during the broadcast so that the compiled summary has a shorter duration than the television program.

8. A method executable by a television receiver to create a summary of a television broadcast, the method comprising:
   receiving the television broadcast at the television receiver;
   computing, for each of a plurality of video frames of the television broadcast, a metric that represents the contents of the video frame with a cryptographic digest that is a function of luminance and chrominance values of at least some of the video pixels in the video frame, wherein the computing is performed by the television receiver;
   correlating, by the television receiver, the metrics representing the contents of different video frames to thereby automatically identify repeated portions of the television broadcast; and
   compiling, by the television receiver, the repeated portions of the television broadcast as the summary of the television broadcast.

9. The method of claim 8 wherein the metric is a function of values associated with only a subset of the video pixels in the video frame.

10. The method of claim 8 wherein the correlating is bounded in time such that only video frames occurring with a period of time are evaluated to identify the repeated portions of the television broadcast.

11. The method of claim 8 further comprising identifying beginnings and ends of the repeated portions of the television broadcast based upon the metrics.

12. The method of claim 8 wherein the television broadcast is selected by a viewer of the television broadcast but the computing, correlating and compiling are performed automatically by the television receiver without input from the viewer.

13. The method of claim 8 wherein the compiled summary of the television program contains only the identified portions of the television broadcast that are replayed during the broadcast so that the compiled summary has a shorter duration than the television broadcast.

\* \* \* \* \*